United States Patent [19]

Mim

[11] 4,305,264
[45] Dec. 15, 1981

[54] DEVICE FOR DAMPING VIBRATIONS OF A DRILLING TUBE

[75] Inventor: Franz Mim, Göppingen, Fed. Rep. of Germany

[73] Assignee: Gebrüder Heller Verwaltungsgesellschaft mit beschränkter Haftung, Achim-Uphusen, Fed. Rep. of Germany

[21] Appl. No.: 100,078

[22] Filed: Dec. 4, 1979

[30] Foreign Application Priority Data

Dec. 5, 1978 [DE] Fed. Rep. of Germany ....... 2852520

[51] Int. Cl.³ ............................................. F16F 15/10
[52] U.S. Cl. ..................................... 64/23.6; 64/1 V; 74/574
[58] Field of Search .................. 74/574, 604; 64/1 V, 64/23.6, 23.5

[56] References Cited

U.S. PATENT DOCUMENTS

| 1,903,336 | 4/1933 | Fifield | 74/574 |
| 2,198,403 | 4/1940 | Canady | 74/574 |
| 2,559,100 | 7/1951 | White | 64/23.6 |
| 2,931,464 | 4/1960 | Zwick | 74/574 |
| 3,207,000 | 9/1965 | White | 74/574 |

Primary Examiner—Kenneth Dorner
Attorney, Agent, or Firm—Martin A. Farber

[57] ABSTRACT

A device for damping vibrations of a drilling tube by the slip between the tube and a fly-wheel which surrounds the tube and is frictionally connected to the tube by a slotted sleeve which is axially displaceable by adjusting means for adjusting the frictional connection. The adjusting means are connected to the sleeve by bearings so that they can be actuated while the tube and hence the sleeve and the fly-wheel are rotating during drilling.

13 Claims, 7 Drawing Figures

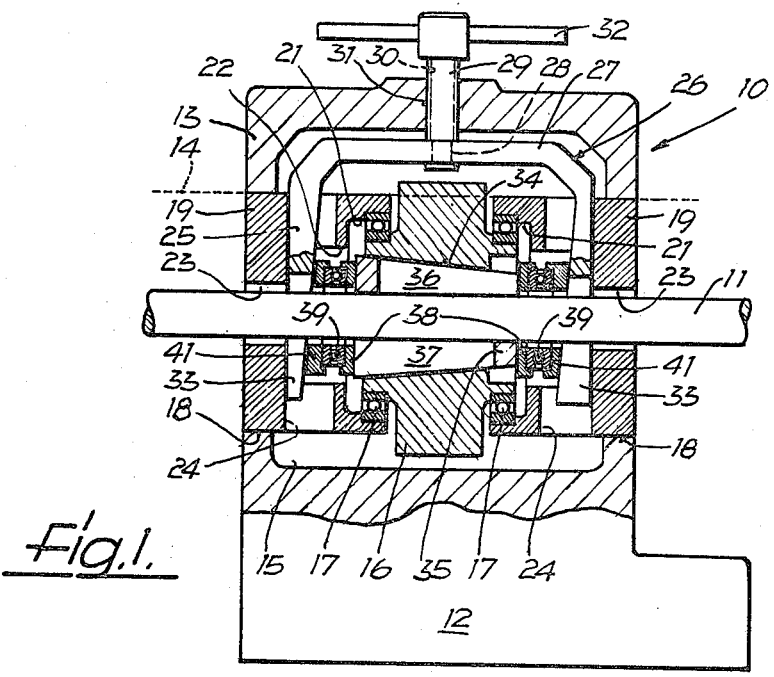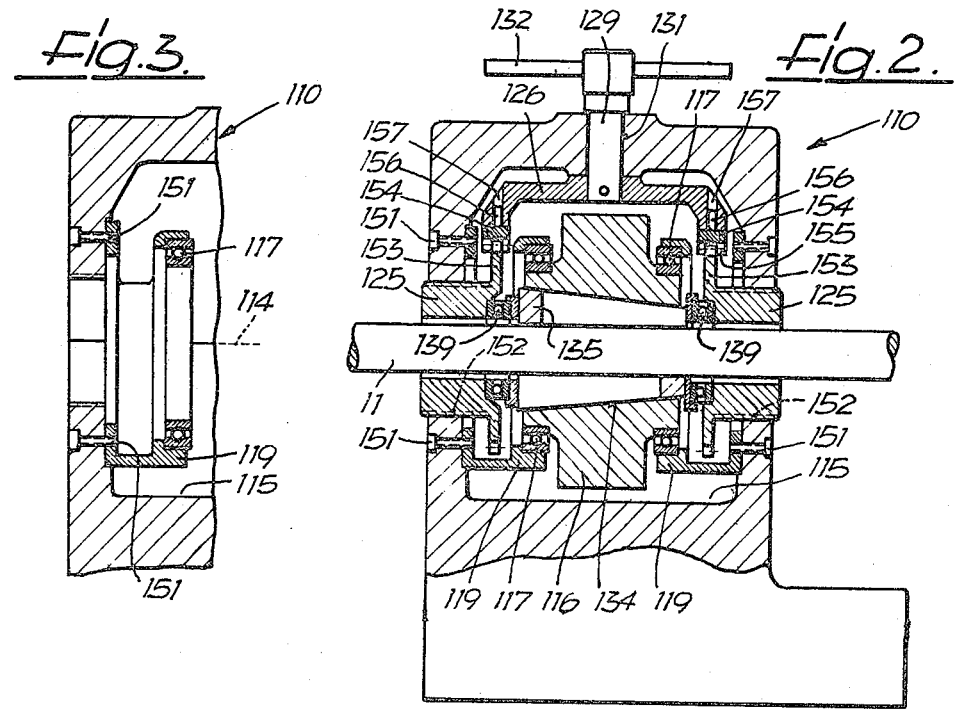

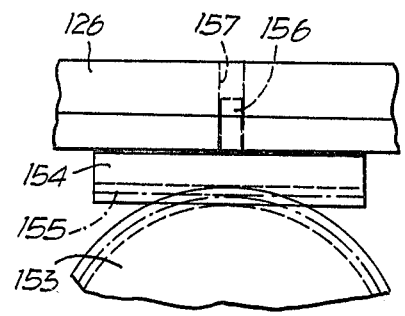
_Fig.4._
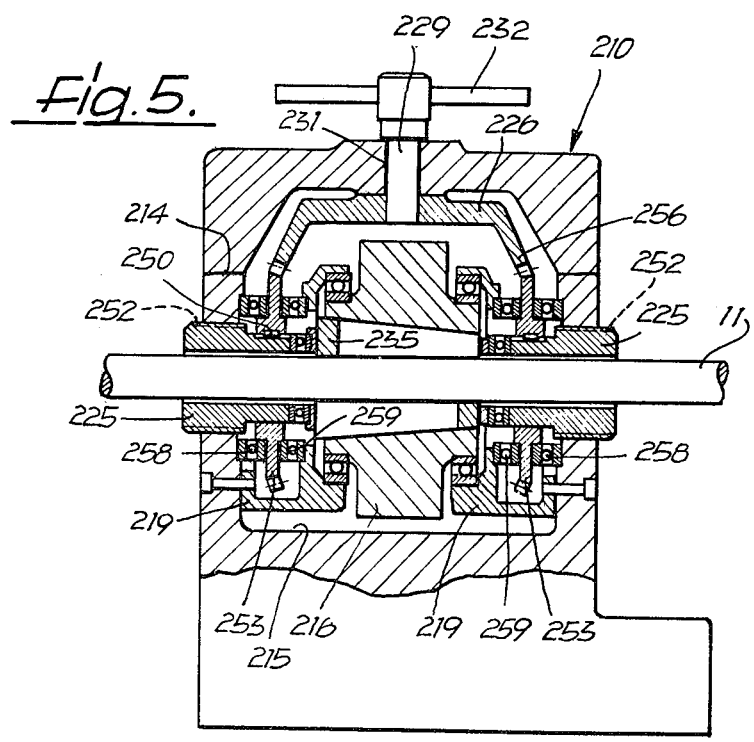
_Fig.5._

DEVICE FOR DAMPING VIBRATIONS OF A DRILLING TUBE

BACKGROUND OF THE INVENTION

1. Field of the Invention

This invention relates to a vibration damper for rotating drilling tubes on deep-drilling machines, comprising an annular flywheel.

2. Description of Prior Art

Vibration dampers of this kind are known and are intended to damp or suppress drilling vibrations by the slip between the flywheel and the drilling tube. The frictional contact between the flywheel and the drilling tube can be adjusted by a clamping sleeve, through the agency of adjusting members, for optimum damping or suppression of the vibrations according to present conditions. The drilling tube support bearing, which carries the vibration damper is mounted adjustably on a machine support and can be brought into any desired position by means of a hand crank, in order thus to provide optimum support and damping of the drilling tube. In the known vibration dampers, the adjusting members each engage a tapped bore in the flywheel by means of an external screwthread and rotate together with the mass. It is therefore practically impossible to adjust the clamping sleeve during drilling, i.e. when the drilling tube is rotating and hence when the flywheel mass is rotating.

SUMMARY OF THE INVENTION

One object of the invention is to provide a vibration damper for rotating drilling tubes whereby adjustment of the frictional contact between an inertia mass like a flywheel and the drilling tube can be carried out very easily even during operation.

Another object of the invention is to provide bearings between a connecting means which frictionally connects the drilling tube with the inertia mass and an actuating means for actuating the connecting means for adjusting the frictional connection while the tube is rotating.

In one advantageous embodiment as regards structural simplicity, two adjusting members each engaging a tapped bore in the support for the inertia mass by means of an external screwthread are each provided with an actuating system situated outside the support, the actuating system being a handwheel or a disc, for example, having openings to receive a rod at its periphery.

In a still further simplified form of adjustment for a clamping sleeve as the connecting means between the tube and the inertia mass, an adjusting system is used by means of which the two adjusting members are movable simultaneously and to the same extent. All that is required, therefore, is to actuate the adjusting mechanism in order to change the frictional contact between the inertia mass and the drilling tube.

The adjusting mechanism may comprise hydraulic cylinders which themselves form adjusting members of the adjusting means or which act on axially adjustable members in the support. Alternatively, the adjusting mechanism may comprise eccentrics or the like which act on the adjusting members and which are actuated simultaneously by a common drive.

The invention is explained in detail in the following description of embodiments of vibation dampers shown in a very simplified diagrammatic form in the drawing.

BRIEF DESCRIPTION OF THE DRAWINGS

FIG. 1 is a side view of a support stand of a first embodiment, in which the part of the support containing the vibration damper is shown in axial section.

FIG. 2 is a view similar to FIG. 1 showing a second embodiment.

FIG. 3 is a detail of FIG. 2 showing the flywheel bearing.

FIG. 4 is a side view of a rack transmission which connects the connecting member to each adjusting member in the simplified embodiment according to FIGS. 2 and 3.

FIG. 5 is a view similar to FIG. 2 showing a third embodiment.

DETAILED DESCRIPTION OF A PREFERRED EMBODIMENT

Figure 6:
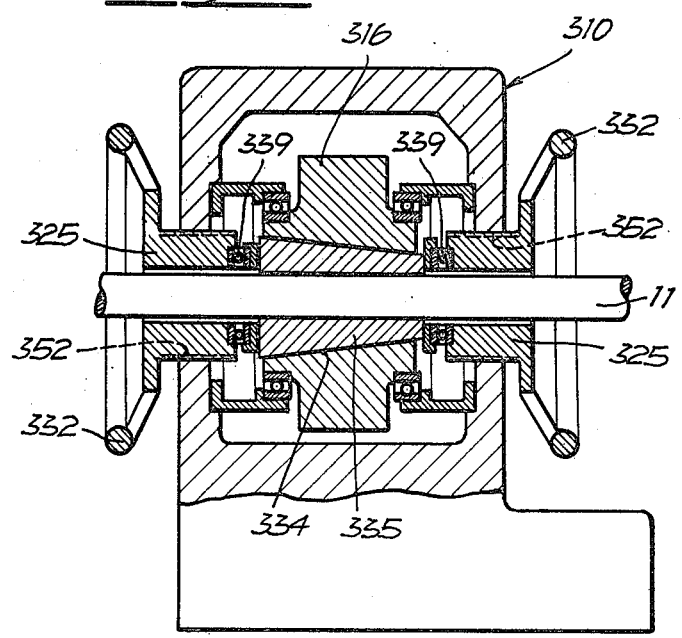
FIG. 6 is an axial section of a fourth embodiment.

A supporting stand for a drilling tube 11 bears the general reference 10 in FIG. 1 and consists of a bottom part 12 and a top part 13 abutting at a parting line 14 and interconnected by bolts (not shown). The bottom part 12 of the stand 10 is mounted adjustably on a machine bed (not shown) and has a hand crank (not shown) by means of which it can be brought in known manner into any desired position along the bed in order thus to provide optimum support and damping for the tube 11.

The two parts 12 and 13 of the stand 10 have a cavity 15 in which a vibration damper is disposed to damp vibrations of the tube 11. The damper comprises an annular flywheel mass 16 mounted inside the cavity 15 on ball bearings 17 to rotate about the longitudinal axis of the tube 11. Bearing supports 19 are fixed by fixing means (not shown), e.g. bolts, in square recesses 18 in the bottom part 12 of the stand for this mounting of the mass 16. Three concentric cylindrical boreholes 21, 22 and 23 are provided in the middle of these bearing supports 19 and form a graduated opening through the supports 19. The outer races of the ball bearings 17 are fixed at the outer ends of the inner surfaces of the bore holes 21 having the largest diameter. The outer bore holes 23 surround the tube 11 with clearance.

The supports 19 also have slots 24 extending perpendicularly to the longitudinal axis of the tube 11 and serving as guides for the limbs of a U-shaped member 26, the limbs being constructed as wedge-shaped adjusting elements 25, the web 27 of the member 26 having at the center a borehole 28 in which the end of a bolt 29 is mounted so as to be rotatable but axially non-slidable. The bolt has an external screwthread 30 by means of which it is screwed into a tapped bore 31 in the top part 13 of the stand 10. At its end projecting from the stand 10 the bolt 29 bears a handle 32.

The two free ends 33 of the adjusting members 25 forming the limbs of the member 26 are forked to engage around the tube 11. The facing side surfaces of the members 25 are parallel to one another and are inclined by the same acute angle to the longitudinal axis of the tube 11.

The mass 16 has a frusto-conical aperture 34 which is coaxial with its axis of rotation and which forms a seat for a plastic clamping sleeve 35 which has a central bore to fit the tube 11, a frusto-conical outer surface for abutment against the walls of the frusto-conical aperture 34 and axially extending and radially continuous slots 36 and 37. These extend alternately to one or other end of the sleeve 35. Rings 38 are fixed on the two end faces of the sleeve 35 perpendicular to the longitudinal axis of the tube 11 and in them are fixed in each case one half of axial thrust ball bearings 39, of which the half remote from the sleeve 35 bears rings 41, of which the outer surfaces remote from the sleeve 35 are inclined to the longitudinal axis of the tube 11 by the same angle as the facing surfaces of the members 25. The U-member 26, the sleeve 35 and the ball bearings 39 with their rings 38 and 41 are so dimensioned that the inclined surfaces of the members 25 bear against the inclined surfaces of the rings 41.

If the sleeve 35 is pressed sufficiently deeply into the aperture 34 so that it is slightly compressed, it bears with frictional contact against both the mass 16 and the tube 11. If vibrations occur in the tube, they are damped by the friction between the mass 16 and the tube 11, such damping being dependent upon the frictional contact produced by the sleeve 35. In the exemplified embodiment shown in FIG. 1, the two wedge-shaped members 25 can be moved perpendicularly to the longitudinal axis of the tube 11, so that the sleeve 35 is moved in parallel relationship to the tube axis, by rotation of handle 32, so that it is possible easily to produce any desired frictional contact between the mass 16 and the tube 11.

DETAILED DESCRIPTION OF FURTHER EMBODIMENTS

In the embodiment shown in FIGS. 2 to 4, those parts which have the same effect as in the embodiment shown in FIG. 1 have the same reference numeral plus 100, so that reference may be made to the description of the exemplified embodiment shown in FIG. 1.

The stand 110 of the embodiment shown in FIGS. 2 to 4 differs from the stand according to FIG. 1 in that the parting line 114 is in this case disposed level with the longitudinal axis of the tube 11. As will be seen from FIGS. 2 and 3, the supports 119 are of different construction and are fixed to the inner walls of the cavity 115 by bolts 151. Otherwise, the mounting of the flywheel mass 116 by means of the ball bearings 117 corresponds to the exemplified embodiment shown in FIG. 1. As in the first exemplified embodiment, the mass 116 again has a conical aperture 134 serving as a seat for a slotted plastic clamping sleeve 135.

Contrary to the previously described exemplified embodiment, the adjusting members 125 are in this case constructed as sleeves having contra-directional external screwthreads 152 at their periphery and mounted in tapped bores in the stand 110, which are substantially concentric to the longitudinal axis of the tube 11. At its end facing the sleeve 135, each adjusting member 125 has a collar 153 the outer periphery of which is provided with teeth extending in parallel relationship to the axis of rotation of the members 125, so as to form a spur gear. Half of an axial thrust ball bearing 139 is fixed on the adjusting members 125 at each of the ends facing the sleeve 135, and the free halves of the bearings 139 bear abutment surfaces for the sleeve 135.

The bolt 129, which also has a handle 132 at its outer end, is mounted rotatably but axially non-slidably in a bore 131 in the stand 110. A plate-shaped disc 126 is fixed on the end of the bolt 129 projecting into the cavity 115 and serves as a connecting member for connecting the bolt 129 to the adjusting members 125. A rack mechanism is provided for this connection, the middle of the side of the rack 154 remote from the teeth 155 bearing a pin 156 extending perpendicularly to its longitudinal axis. Two diametrically opposite boreholes 157 extending in parallel relationship to the longitudinal axis of the bolt 129 are provided in the downwardly extending edge of the disc 126 and receive the pins 156 of the racks 154 so that the latter are connected to the disc 126 so as to be rotatable about the pins 156. The diameter of the disc and hence the distance between the axes of the boreholes 157 and the height of the edge and the corresponding dimension of the racks 154 are so selected that the teeth 155 of the rack mesh with the teeth of the collar 153 of the two adjusting members 125.

When the handle 132 is rotated, the disc 126 rotates and displaces the racks 154 in a direction perpendicular to the drawing plane in FIG. 2, so that the adjusting members 125 are rotated and are axially displaced in the same direction because of their contra-direction screwthreading. Since the teeth 155 of the rack 154 are parallel to the teeth of the collar 153, given an appropriately wide construction of the rack 154, the members 125 can be moved relatively to the racks 154 in the direction of the longitudinal axis of the tube 11 by a restricted amount relatively to one another without the teeth of the collars 153 and of the racks 154 becoming disengaged. Since only a very small axial displacement of the sleeves 135 is necessary for adjustment of the required frictional contact between the flywheel mass 116 and the tube 11, engagement of the teeth can always be ensured without any appreciable expense.

In the embodiment shown in FIG. 5, those parts of a corresponding function to the parts in the embodiment shown in FIGS. 2 to 4 again have the same reference numerals plus the number 100, so that reference may be made to the preceding embodiment.

In this embodiment, the adjusting members 225 are again sleeves with contra-directional external screwthreads 252 fitted in corresponding tapped bores in the stand 210. The members 225 differ from the members 125, however, in that, instead of the collar 153, a toothed ring 253 is mounted to be axially slidable but non-rotatable on each member 225. The non-rotatable connection is provided by a splined connection 250.

Like the bolt 129, bolt 229 is mounted rotatably but axially non-slidably in the bore 231 of the stand 210. At its end projecting into the cavity 215, a connecting element is provided in the form of a bevel gear 226 which, like the disc 126, partially surrounds the flywheel mass 216 in the form of a plate. The conical toothed rim of the gearwheel 256 engages the likewise conical rim of the toothed rings 253, which are mounted in the stand 210 by means of ball bearings 258 and 259 so as to be rotatable about their axis but axially non-slidable. In this case the ball bearing 258 is fixed on the inner wall of the stand 210 and the ball bearing 259 is fixed on the bearing support 219. In this case the parting line 214 of the stand 210 extends above the ball bearing 258.

In this exemplified embodiment too, the bolt 229 has a handle 232 at its outer end for rotation of the bevel gear 226. The toothed rings 253 and hence the members 225 are thus rotated in opposite directions, so that the adjusting members are axially displaced by equal amounts in the same direction because of the contra-directional external screwthreads 252, so that the sleeve 235 is moved inside the mass 216 for adjustment of the required frictional contact.

The invention also enables the adjustment of the required frictional contact between the flywheel mass 16, 116 or 216 and the drilling tube 11 to be obtained fully automatically. For this purpose, the handle 32, 132 or 232 is simply replaced by a motor drive for the bolts 29, 129 or 229, this drive being controlled by an automatic control system or manually.

As in the previously-described embodiments, in the example shown in FIG. 6 the flywheel mass 316 is mounted in the stand 310 for rotation concentrically of the tube 11 and has a frusto-conical aperture 334 which is disposed along the longitudinal axis and which contains a plastic clamping sleeve 335 having an outer surface corresponding to the aperture so that it can bear against the conical surface bounding the aperture. A cylindrical central passage bore in the plastic clamping sleeve 335 and longitudinal slots allow the sleeve 335 to bear against the tube 11 as well.

As in the embodiments shown in FIGS. 2 and 5, the two adjusting members 325 associated with the sleeve 335 are constructed as sleeves with external screwthreading 352. They are screwed into tapped bores which are disposed in the stand 310 coaxially of the central bore in the plastic clamping sleeve. The screwthreads of the two sleeves may be disposed in the same or, preferably, opposite directions. An axial bearing 339 is provided in each case to support the members 324 at each end face of the sleeve 335.

As will be seen in FIG. 6, the ends of the members 325 situated outside the stand 310 each have a handwheel 332. The two handwheels 332 simply have to be turned for axial displacement of the sleeve 335 relatively to the flywheel mass 316, in the same directions if the external screwthreading of the sleeves has the same direction, and to the same extent if the two screwthreads have the same pitch.

Figure 7:
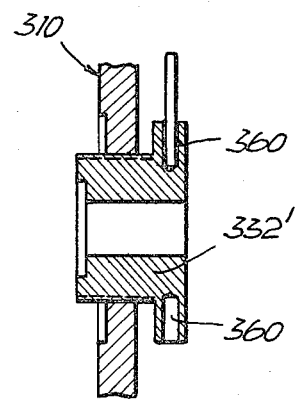
FIG. 7 is an incomplete section of a modification of the fourth embodiment.

Instead of the two handwheels 332, a perforated disc 332' can be provided in each case (see FIG. 7) the disc having a plurality of boreholes 360 which are distributed over the periphery and which are open in the outward direction as considered radially to receive a rod or the like so that the sleeve can be turned through a certain angle. The rod is then removed from the perforated disc.

What is claimed is:

1. A device for damping vibrations of a drilling tube rotatably mounted in a deep-drilling machine coaxially to an axis of rotation, comprising
   an inertia mass,
   means comprising a support for rotatably supporting said inertia mass for rotation substantially about said axis of rotation,
   a connecting means for frictionally connecting the tube to said inertia mass, said connecting means being adjustable for adjusting the frictional connection between the tube and said inertia mass,
   an adjusting means for adjusting said connecting means,
   bearing means for operatively connecting said adjusting means to said connecting means while permitting said connecting means to be rotated about said axis of rotation relative to said adjusting means,
   said support means supporting said adjusting means independent of said inertia mass such that said adjusting means does not take part in the rotation of said inertia mass.

2. The device as set forth in claim 1, wherein
   said support means is for rotatably supporting said inertia mass independently of said adjusting means and independently of and not on said tube,
   said support means is for supporting said adjusting means independent of, spaced from and non-rotatable relative to said tube.

3. The device as set forth in claim 1, wherein
   said bearing means is disposed between said adjusting means and said connecting means, said bearing means is for permitting adjustment of said adjusting means during rotation of said connecting means and said tube and constitutes a thrust bearing means for transmission of the adjustment from said adjusting means to said connecting means.

4. The device as set forth in claim 1, wherein
   said support means includes another bearing means for said rotatably supporting of said inertia mass.

5. A device for damping vibrations of a drilling tube rotatably mounted in a deep-drilling machine coaxially to an axis of rotation, comprising
   an inertia mass,
   a support for rotatably supporting said inertia mass for rotation about said axis of rotation,
   a connecting means for frictionally connecting the tube to said inertia mass, said connecting means being adjustable for adjusting the frictional connection between the tube and said inertia mass,
   an adjusting means for adjusting said connecting means, wherein a bearing means is provided for connecting said adjusting means to said connecting means so that said connecting means can be rotated about said axis of rotation relative to said adjusting means,
   said inertia mass has the form of an annular body having an axis of symmetry and a frusto-conical opening extending coaxially to said axis of symmetry,
   said annular body being mounted coaxially to said axis of rotation in said support,
   said connecting means has the form of a slotted sleeve having two ends, a frusto-conical outer surface which fits to said frusto-conical opening so that said frusto-conical opening forms a seat for said sleeve, and a cylindrical inner surface which fits to the outer surface of the tube,
   said sleeve being axially displaceable for adjusting the frictional connection between said annular body and the tube when the tube extends through said sleeve,
   said adjusting means having two axially displaceable adjusting members for said two ends of said sleeve,
   said bearing means having at least two bearings located between said two ends of said sleeve and said two adjusting members.

6. A device according to claim 5, wherein each of said adjusting members has an outer thread, and said support has two tapped bores extending coaxially to said axis of rotation for receiving said adjusting members.

7. A device according to claim 6, wherein for each of said adjusting members an actuating means is provided.

8. A device according to claim 5, wherein an actuating means is provided for simultaneous and equal displacements of said two adjusting members.

9. A device according to claim 8, wherein said actuating means comprises a threaded bolt and a U-shaped member having two ends, and wherein said support has a tapped bore with an axis which is perpendicular to said axis of rotation and is directed to said annular body, said threaded bolt being mounted in said tapped bore with one end facing said annular body, said U-shaped member being rotatably connected to said end of said threaded bolt so that said U-shaped member partially encloses said annular body and said two ends of said U-shaped members extend beyond said axis of rotation and has surfaces which face one another and are equally inclined to said axis of rotation, and wherein further said adjusting members have surfaces remote from said sleeve which are equally inclined as and engage said inclined surfaces of said ends, so that by turning said threaded bolt said U-shaped member is moved perpendicularly to said axis of rotation and moves both of said adjusting members simultaneously in the same direction for equal displacements, for axially displacing said sleeve.

10. A device according to claim 8, wherein
   each of said adjusting members has an outer thread,
   said support has two tapped bores extending coaxially to said axis of rotation for receiving said adjusting members,
   said actuating means comprises a bolt and a connecting member,
   said support comprises a bore with an axis which is perpendicular to said axis of rotation and is directed to said annular body,
   said bolt being mounted rotatably and axially non-shiftably in said bore with one end facing said annular body, said connecting member being fixed to said end of said bolt,
   transmission means for connecting said connecting member to said threaded adjusting members, so that by turning said bolt said threaded adjusting members are simultaneously turned for equal axial displacements, for axially displacing said sleeve.

11. A device according to claim 10, wherein said transmission means comprises toothed rims fixed to both of said threaded adjusting members and racks, the teeth of which mesh with the teeth of said rims, said racks being rotatably connected to said connecting member, so that by turning said bolt said connecting member moves said racks for simultaneous turn of said threaded adjusting members.

12. A device according to claim 10, wherein said transmission means comprises bevel gears fixed to both of said threaded adjusting members and said connecting member being formed as a bevel gear which meshes both of said bevel gears fixed to said adjusting members, so that by turning said bolt said connecting member simultaneously turns said threaded adjusting members.

13. A device according to claim 8, wherein said actuating means comprises a handle for actuating said actuating means.

* * * * *